No. 814,066. PATENTED MAR. 6, 1906.
G. M. MYERS.
ANIMAL TRAP.
APPLICATION FILED JUNE 3, 1905.
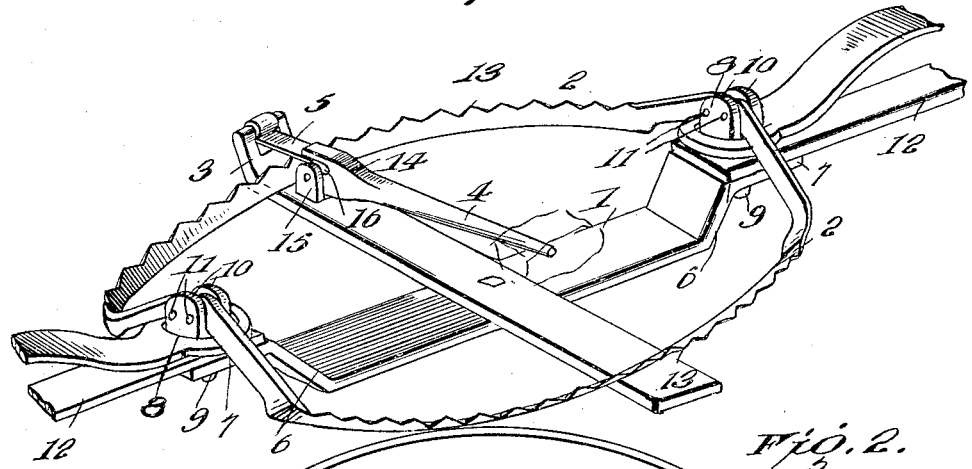
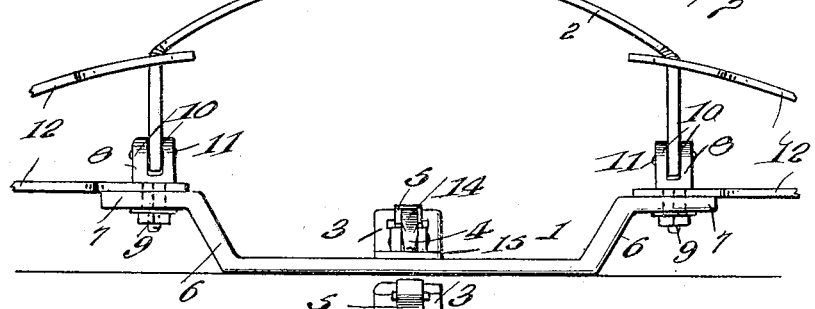
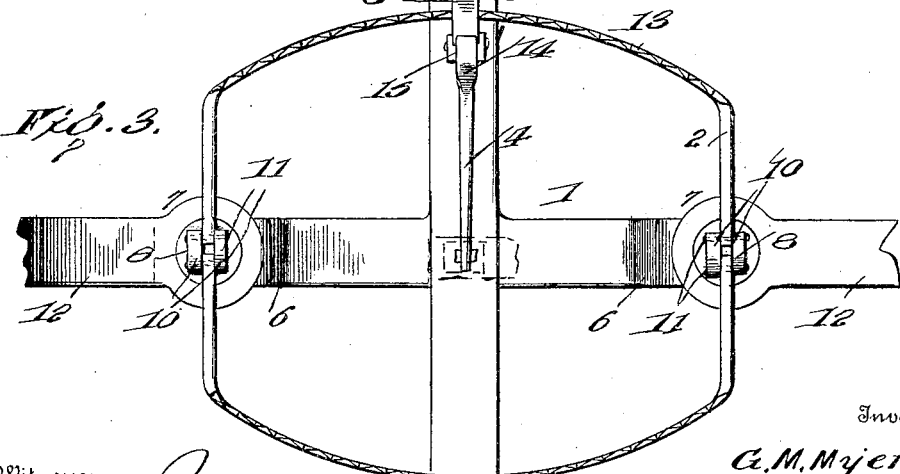
Inventor
G. M. Myers.
Witnesses
By
Attorney

UNITED STATES PATENT OFFICE.

GEORGE M. MYERS, OF MIDLAND, TEXAS.

ANIMAL-TRAP.

No. 814,066.

Specification of Letters Patent.

Patented March 6, 1906.

Application filed June 3, 1905. Serial No. 263,670.

*To all whom it may concern:*

Be it known that I, GEORGE M. MYERS, a citizen of the United States, residing at Midland, in the county of Midland and State of Texas, have invented certain new and useful Improvements in Animal-Traps, of which the following is a specification.

This invention embodies improvements in animal-traps; and the essential features of the invention are comprised in the detail structure and mounting of the several parts of the invention whereby a device of simplified construction and operation and one possessed of great durability is produced.

For a full description of the invention and the merits thereof and also to acquire a knowledge of the details of construction of the means for effecting the result reference is to be had to the following description and accompanying drawings, in which—

Figure 1 is a perspective view of a trap embodying the invention, parts arranged as when set. Fig. 2 is a front elevation showing the jaws of the trap closed after operation thereof. Fig. 3 is a top plan view of the trap, the jaws open, bringing out clearly the arrangement of the parts.

Corresponding and like parts are referred to in the following description and indicated in all the views of the drawings by the same reference characters.

In its general construction the trap embodying the invention is of a form similar to many traps at present in use and embodies a longitudinal base-plate 1, to which the jaws 2 are pivoted, a transverse trigger-bar 3 extending from the plate 1 and carrying a trigger 4 and catch 5, which coöperates therewith. The base-plate 1 is of peculiar formation, having its end portions extended upwardly, as shown at 6, and provided with lateral extensions 7. The extensions 7 are provided with vertical apertures, through which the lower portions of pivot members 8 pass, said pivot members 8 being held in place by transverse pins 9, passing therethrough beneath the extensions 7. The upper end portions of the pivot members 8 are bifurcated to form the spaced lugs 10, between which the ends of the jaws are pivoted, as shown at 11, a pivot-pin passing through the extremity of each jaw. Springs 12 coact with the jaws, and these springs are of the curved form most commonly in use, the lower portions of each spring having a bearing upon the upper side of the adjacent extension 7, the upper portion having an opening to permit the spring to ride upwardly upon the end portions of the jaws adjacent in order to force the jaws closed upon discharge of the trap. The lower portions of the springs 12 are provided with openings to receive the pivot members 8, as shown most clearly in Fig. 2 of the drawings. The jaws 2 have the meeting or abutting portions thereof at the ends sharpened to an edge, as shown at 13, in order that the said jaws may not be interfered with in closing by pebbles lodging therebetween, such often keeping the jaws from closing together properly and permitting the animal to pull away from the trap after being caught.

The trigger-bar 3 has its outermost end inclined upwardly, as shown at 14, and apertured to receive the end portion of the catch 5, which is formed with a loop passing through the apertures and pivotally connecting the catch with the portion 14 of the said bar 3. The vertical aperture in the bar 3 adjacent the inclined end 14 thereof receives a pivot member 15, and the trigger 4 is pivoted to this member 15.

The jaw 2 of the trap nearer the trigger 4 is adapted to be forced downwardly against the tension of the springs 12 to admit of engagement of the catch 5 thereover, and when this catch 5 has been so engaged the innermost extremity of the catch is adapted to be received in a notch 16 in an end of the trigger 4 adjacent the pivot member 15, and when the above has been done the jaws will be held open with the trigger in operative position to be tripped or forced downwardly by the animal when he attempts to carry off the bait. Of course as soon as the trigger 4 is moved in the above manner the same is disengaged from the catch 5 and the springs 12 force the jaws closed in a manner readily apparent. The construction of the trigger and its operative connection with the catch 5 is such as to admit of a very quick or almost instantaneous action of the jaws when the trigger is actuated, and this is of no small advantage in a practical device of this type. Further, the construction of the plate 1 is such that the jaws 2 are elevated from the lowermost portion of the plate, so as to catch or engage higher up on the animal than would otherwise be the case, and the above is accomplished without the necessity of use of larger jaws and springs of greater power than ordinarily employed. Again, the springs 12, which have a bearing against the upper sides of the extensions 7, are elevated from the lowermost portion of the plate 1 in such a way that as conditions of service require that the plate 1 be buried the springs may be out of the ground, though concealed, and the latter will not be damaged in any way.

Having thus described the invention, what is claimed as new is—

An animal-trap substantially as described, embodying the base-plate having its end portions extended upwardly and provided with lateral extensions, the lateral extensions being vertically apertured, pivot members received in the vertical apertures of the lateral extensions of the base-plate, said pivot members having their upper extremities bifurcated to form spaced lugs, coacting jaws having the end portions thereof pivoted between the spaced lugs of the respective pivot members, curved springs coacting with said jaws and having the lower portions thereof bearing upon the upper sides of the lateral extensions of the base-plate and apertured to receive the pivot members, the upper portion of the springs being also apertured to coact with the jaws in forcing the same closed, a transverse trigger-bar extending from the base-plate, the outermost end of said bar being inclined upwardly and apertured, a catch pivoted to the apertured end of the upwardly-inclined portion of the trigger-bar, a pivot member carried by the trigger-bar adjacent the catch, and a trigger pivoted to the pivot member of the trigger-bar and provided with a notch to receive an end of the catch when the latter is engaged with the adjacent jaw of the trap.

In testimony whereof I affix my signature in presence of two witnesses.

GEORGE M. MYERS. [L. S.]

Witnesses:
L. M. MURPHY,
J. M. GLAZE.